United States Patent
Sloan et al.

(10) Patent No.: US 6,782,384 B2
(45) Date of Patent: Aug. 24, 2004

(54) METHOD OF AND SYSTEM FOR SPLITTING AND/OR MERGING CONTENT TO FACILITATE CONTENT PROCESSING

(75) Inventors: William N. Sloan, Jamaica Plain, MA (US); Kem Morehead, Cambridge, MA (US); Herman Wing Hin Ho, Thornhill (CA); Kenneth Y. Liu, Somerville, MA (US); Richard B. Mitchell, Groton, MA (US); Umesh Shankar, Berkeley, CA (US)

(73) Assignee: Idiom Merger Sub, Inc., Waltham, MA (US)

( * ) Notice: Subject to any disclaimer, the term of this patent is extended or adjusted under 35 U.S.C. 154(b) by 368 days.

(21) Appl. No.: 09/965,747

(22) Filed: Sep. 28, 2001

(65) Prior Publication Data

US 2003/0069879 A1 Apr. 10, 2003

Related U.S. Application Data

(60) Provisional application No. 60/237,537, filed on Oct. 4, 2000.

(51) Int. Cl.[7] .............................................. G06F 17/30
(52) U.S. Cl. .............................................. 707/3; 704/4
(58) Field of Search ........................... 707/3; 704/3, 7, 704/9, 2, 4; 370/352; 715/501.1, 513; 345/641, 684; 434/157

(56) References Cited

U.S. PATENT DOCUMENTS

| | | | |
|---|---|---|---|
| 5,111,398 A | * | 5/1992 | Nunberg et al. ................ 704/9 |
| 5,349,368 A | | 9/1994 | Takeda et al. |
| 5,708,825 A | | 1/1998 | Sotomayor |
| 5,848,386 A | | 12/1998 | Motoyama |
| 5,987,403 A | | 11/1999 | Sugimura |
| 6,285,978 B1 | * | 9/2001 | Bernth et al. ................... 704/7 |
| 6,470,306 B1 | * | 10/2002 | Pringle et al. .................. 704/3 |

FOREIGN PATENT DOCUMENTS

EP 0887748 3/1998

OTHER PUBLICATIONS

Copy of PCT International Search Report, 4 pp.

* cited by examiner

*Primary Examiner*—Safet Metjahic
*Assistant Examiner*—Etienne P Leroux
(74) *Attorney, Agent, or Firm*—McDermott Will & Emery LLP

(57) ABSTRACT

A method of identifying units of translation in a block of source content, so as to segment the block of content into the units of translation, includes selecting one or more delineating characteristics of the source content in addition to lexical characteristics. The method further includes determining instances of the delineating characteristics in the block of source content, and identifying pairs of the instances within the text. The method also includes, for each pair of instances of the delineating characteristics, associating a first instance of the pair with a first boundary of a unit of translation, and associating a second instance of the pair with a second boundary of the unit of translation. One embodiment further includes identifying target units of translation in a block of target content, and assigning associations among the source units of translation and the target units of translation.

3 Claims, 8 Drawing Sheets

110 — Source content:

The Sun goes through cycles of high and low activity that repeat approximately every 11 years. The number of dark spots on the Sun (sunspots) marks this variation; as the number of sunspots increases, so does solar activity. Sunspots are sources of flares, the most violent events in the solar system. In a matter of minutes, a large flare releases a million times more energy than the largest earthquake.

112 — Selected delineating characteristics:

Lexical

FIG. 2A encountered before the adverse hosts could meet. A wide and apparently an impervious boundary of forests severed the possessions of the hostile provinces of France and England. The hardy colonist, and the trained European who fought at his side, frequently expended months in struggling against the rapids of the streams, or in effecting the rugged passes of the mountains, in quest of an opportunity to exhibit their courage in a more martial conflict. But, emulating the patience and self-denial of the practiced native warriors, they learned to overcome every difficulty; and it would seem that, in time, there was no recess of the woods so dark, nor any secret place so lovely, that it might claim exemption from the inroads of those who had pledged their blood to satiate their vengeance, or to uphold the cold and selfish policy of the distant monarchs of Europe.

Perhaps no district throughout the wide extent of the intermediate frontiers can furnish a livelier picture of the cruelty and fierceness of the savage warfare of those periods than the country which lies between the head waters of the Hudson and the adjacent lakes.

The facilities which nature had there offered to the march of the combatants were too obvious to be neglected. The lengthened sheet of the Champlain stretched from the frontiers of Canada, deep within the borders of the neighboring province of New York, forming a natural passage across half the distance that the French were compelled to master in order to strike their enemies. Near its southern termination, it received the contributions of another lake, whose waters were so limpid as to have been exclusively selected by the Jesuit missionaries to perform the typical purification of baptism, and to obtain for it the title of lake du Saint Sacrement. The less zealous English thought they conferred a sufficient honor on its unsullied fountains, when possessors of its wooded scenery of their native right to perpetuate its original appellation of Horican.

James Fenimore Cooper: The Last of the Mohicans

| First paragraph | Second paragraph | Third paragraph |

FIG. 3A

First paragraph:

It was a feature peculiar to the colonial wars of North America, that the toils and dangers of the wilderness were to be encountered before the adverse hosts could meet. A wide and apparently an impervious boundary of forests severed the possessions of the hostile provinces of France and England. The hardy colonist, and the trained European who fought at his side, frequently expended months in struggling against the rapids of the streams, or in effecting the rugged passes of the mountains, in quest of an opportunity to exhibit their courage in a more martial conflict. But, emulating the patience and self-denial of the practiced native warriors, they learned to overcome every difficulty; and it would seem that, in time, there was no recess of the woods so dark, nor any secret place so lovely, that it might claim exemption from the inroads of those who had pledged their blood to satiate their vengeance, or to uphold the cold and selfish policy of the distant monarchs of Europe.

- It was a feature peculiar to the colonial wars of North America, that the toils and dangers of the wilderness were to be encountered before the adverse hosts could meet.
- A wide and apparently an impervious boundary of forests severed the possessions of the hostile provinces of France and England.
- The hardy colonist, and the trained European who fought at his side, frequently expended months in struggling against the rapids of the streams, or in effecting the rugged passes of the mountains, in quest of an opportunity to exhibit their courage in a more martial conflict.
- But, emulating the patience and self-denial of the practiced native warriors, they learned to overcome every difficulty; and it would seem that, in time, there was no recess of the woods so dark, nor any secret place so lovely, that it might claim exemption from the inroads of those who had pledged their blood to satiate their vengeance, or to uphold the cold and selfish policy of the distant monarchs of Europe.

FIG. 3B

Third paragraph:

The facilities which nature had there offered to the march of the combatants were too obvious to be neglected. The lengthened sheet of the Champlain stretched from the frontiers of Canada, deep within the borders of the neighboring province of New York, forming a natural passage across half the distance that the French were compelled to master in order to strike their enemies. Near its southern termination, it received the contributions of another lake, whose waters were so limpid as to have been exclusively selected by the Jesuit missionaries to perform the typical purification of baptism, and to obtain for it the title of lake du Saint Sacrement. The less zealous English thought they conferred a sufficient honor on its unsullied fountains, when they bestowed the name of their reigning prince, the second of the house of Hanover. The two united to rob the untutored possessors of its wooded scenery of their native right to perpetuate its original appellation of Horican.

- The facilities which nature had there offered to the march of the combatants were too obvious to be neglected.
- The lengthened sheet of the Champlain stretched from the frontiers of Canada, deep within the borders of the neighboring province of New York, forming a natural passage across half the distance that the French were compelled to master in order to strike their enemies.
- Near its southern termination, it received the contributions of another lake, whose waters were so limpid as to have been exclusively selected by the Jesuit missionaries to perform the typical purification of baptism, and to obtain for it the title of lake du Saint Sacrement.
- The less zealous English thought they conferred a sufficient honor on its unsullied fountains, when they bestowed the name of their reigning prince, the second of the house of Hanover.
- The two united to rob the untutored possessors of its wooded scenery of their native right to perpetuate its original appellation of Horican.

FIG. 3C

METHOD OF AND SYSTEM FOR SPLITTING AND/OR MERGING CONTENT TO FACILITATE CONTENT PROCESSING

CROSS-REFERENCE TO RELATED APPLICATIONS

This application claims the benefit of U.S. Provisional Application No. 60/237,537 entitled "METHOD OF AND SYSTEM FOR SPLITTING AND/OR MERGING CONTENT TO FACILITATE CONTENT PROCESSING" filed on Oct. 4, 2000, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to processing information content, and more particularly, to combining and/or separating segments of this content to simplify and otherwise facilitate translation and other processing functions associated with the content. Over the past few decades, opportunities for international relationships have expanded at a staggering rate. Many factors have contributed to this expansion—improved transportation capabilities, advances in communication and media technologies, opening of once inaccessible cultures, among others. More recently, the Internet (the World Wide Web, in particular) has provided seemingly unlimited access to international audiences. The Internet represents a massive global business opportunity, and has provided the means for a wide range of businesses to deploy a multilingual and multicultural marketing presence, thereby increasing revenue, improving customer loyalty and reinforcing brand recognition.

As information becomes available globally, the role of translators has shifted away from simple transcription of text into a target language. Translators always had to pay close attention to any attributes and linguistic idiosyncrasies of the target culture, as well as understand and adapt to these differences. Now, however, translators must also ensure the timely deployment of the translated content to the designated site. Translation can be made more efficient with greater flexibility in software functionality and the ability to save previous translations for future use. Traditionally, translators worked with hard copy documents, from which they had the flexibility to translate content at any suitable level. Thus, translators had the ability to look at an entire document and translate it without confines. The increased need for efficient content translation has motivated numerous companies to develop tools that automate at least part of the translation process.

To increase the overall speed of content translation, tools have been developed to save translations in some type of memory (referred to herein as "translation memory" or "TM"), so that the tool can make automatic substitutions, and the translator will not have to consider further instances of those translations. The TM provides a record of pairs of units of translation that have already been translated. A "unit of translation" is a segment of content that has been delineated by any of several criteria, as is discussed in more detail herein. Each associated pair in the TM includes a unit of translation from the content in the source language (i.e., the language of the content that is to be translated), and the corresponding translation unit from content in the target language (i.e., the language into which the source content is being translated). In order to populate the TM, prior art translation methods segment content into sentences (or other syntactic units, e.g., words, phrases, etc.) based on predetermined criteria so that the translator can focus on translating one sentence (or other syntactic unit) at a time.

However, differences between the source language and the target language create difficulties in translating directly from one language to another within the constraints of the particular segments chosen. Such differences may include, but are not limited to, differences in grammatical structure, differences in idiomatic expressions, and punctuation differences. Further, segments that are spatially adjacent in the source document may not necessarily be best suited as adjacent in the target content. Content generally cannot be translated word for word, sentence for sentence, paragraph for paragraph, because of these language differences. Another consideration is that competent, efficient translation is typically not deterministic. For example, three translators operating on the same content may well produce three different translations, each of which would be technically correct. Any type of segmentation tool that segments the content based on a rigid set of criteria will force a translator to approach translation of the content on a word for word (etc.) basis.

Flexibility in content segmentation is important because translators must be able to account for the differences in language structures. For instance, translating content sentence by sentence may populate a translation memory with more specific entries. Storing more specific entries in translation memory is useful because doing so increases the likelihood that future translation instances will make use of those entries. However, as described herein, a sentence-to-sentence translation may not be accurate, depending on the languages being used in the translation. For example, the following sentences in Italian:

Per quanto riguarda la Banca Centrale Europea, un euro debole può essere un problema soltanto se aumenta l'inflazione. Però, a 2.3%, l'inflazione nella zona euro è ancora abbastanza modesta.

would be translated as a single sentence in English:

Yet as far as the ECB is concerned, a weak euro is only really a problem if it pushes up inflation; and at 2.3%, inflation in the euro zone is still rather modest. (*The Economist*, Sep. 23–29, 2000, p. 89)

On the other hand, although translating an entire paragraph as a unit may be more accurate, it can be inefficient for translators because doing so will populate the translation memory with entries that are unlikely to be used again.

An additional problem with content segmentation is determining the sentence boundaries. Typically, a period denotes a sentence end. Yet, if a word within a sentence is abbreviated and uses a period (e.g., "Mr."), the period following the abbreviation could be interpreted as a sentence end and the sentence would thus be segmented at that point. Likewise, some languages such as Thai do not even use period punctuation.

It is an object of the present invention to substantially overcome the above-identified disadvantages and drawbacks of the prior art.

SUMMARY OF THE INVENTION

The present invention provides a method of and system for splitting and merging blocks of information content (e.g., textual blocks) so as to simplify and expedite a translator's task in converting content from one language to another. The method and system of the present invention is referred to herein, in general, as "Split/Merge." The textual information to be translated from one language to another is referred to herein as "content." The Split/Merge method and system allows a user (i.e., a translator) to decide, in real time, the level at which he or she wishes to translate content. The translator has the ability to "split" a paragraph into separate sentences, allowing for individual translation of each sentence. Thus, the translation memory contains entries at the sentence level, which are more likely to be repeated than entire paragraphs. In addition, the translator can "merge" selected sentences together to form a single segment for translation. Furthermore, the translator can "merge" all sentences of a paragraph into a single textual "chunk," as well as merge all of the paragraphs into a larger textual "chunk". This split/merge functionality provides flexibility for source material that is not suitable for sentence-by-sentence translation.

The utility of the Split/Merge invention may be exploited in a translation system such as Idiom's WorldServer. In general, WorldServer is a Web-based application that enables enterprises to manage their content while leveraging established Web architecture, content management and workflow systems. A translator uses WorldServer to determine what content he or she needs to translate. The translator can either export the content needing translation to a third party editing tool, or use the Translation Workbench to perform the actual translation. A translator can be an individual contributor, including users that are adapting but not translating content and reviewers who review content.

The Split/Merge feature of the present invention provides value for translators by giving them greater flexibility of how to translate content before performing the translation. In addition, increased flexibility in segmentation will populate the TM with more utilizable entries.

The foregoing and other objects are achieved by the invention which in one aspect comprises a method of identifying one or more source units of translation in a block of source content, so as to segment the block of content into the one or more source units of translation. The method includes selecting one or more delineating characteristics of the source content in addition to lexical characteristics. The method further includes determining instances of the delineating characteristics in the block of source content, and identifying one or more pairs of the instances within the text. The method also includes, for each pair of instances of the delineating characteristics, associating a first instance of the pair with a first boundary of a source unit of translation, and associating a second instance of the pair with a second boundary of the source unit of translation.

Another embodiment of the invention further includes identifying one or more target units of translation in a block of target content, and assigning associations among the source units of translation in the block of source code and the target units of translation in the block of target code.

Another embodiment of the invention further includes translating content in the source units of translation to the associated target units of translation.

In another embodiment of the invention, the delineating characteristics include syntactic characteristics. The method further includes determining pairs of instances of syntactic characteristics of the source content.

In another embodiment of the invention, the delineating characteristics include formatting characteristics. The method further includes determining pairs of instances of formatting characteristics of the source content.

In another embodiment of the invention, the document formatting characteristics include HTML code markers.

In another embodiment of the invention, the delineating characteristics include conceptual characteristics. The method further includes determining pairs of instances of conceptual characteristics of the source content.

In another embodiment of the invention, the conceptual characteristics include spatial adjacency.

In another embodiment of the invention, the delineating characteristics include sound-based characteristics. The method further includes determining pairs of instances of sound-based characteristics of the source content.

In another embodiment of the invention, the sound based characteristics include voice inflections.

In another embodiment of the invention, the delineating characteristics include one or more markers manually inserted by a user. The method further includes determining pairs of instances of markers within the source content.

Another embodiment of the invention further includes translating the one or more source units of translation into a target language so as to form target units of translation, and merging the target units of translation into one or more blocks of target content.

In another embodiment of the invention, the source units of translation are characterized by a first adjacency pattern. The method further includes merging the target units of translation so as to follow the first adjacency pattern.

In another embodiment of the invention, the source units of translation are characterized by a first adjacency pattern. The method further includes merging the target units of translation so as to follow a second adjacency pattern different from the first adjacency pattern.

In another embodiment of the invention, at least one of the source units of translation corresponds with two or more target units of translation.

In another embodiment of the invention, two or more of the source units of translation corresponds with a single target unit of translation.

In another embodiment of the invention, each one of the source units of translation corresponds with a single target unit of translation.

Another embodiment of the invention further includes merging the target units of translation into a hierarchical structure.

Another embodiment of the invention further includes providing one or more predetermined hierarchy criteria. The characteristics of the hierarchical structure are defined by the predetermined hierarchy criteria.

In another aspect, the invention comprises a system for computer assisted identification one or more source units of translation in a block of source content, so as to segment the block of content into the one or more source units of translation. The system includes a user interface for allowing a user to select one or more delineating characteristics of the source content in addition to lexical characteristics. The system further includes a content processor for determining instances of the delineating characteristics in the block of source content, and identifying one or more pairs of the instances. The system also includes, for each pair of instances of the delineating characteristics, a segment processor for associating a first instance of the pair with a first boundary of a source unit of translation. The segment processor also associates a second instance of the pair with a second boundary of the source unit of translation.

In another embodiment of the invention, the content processor further identifies one or more target units of translation in a block of target content. The content processor also assigns associations among the source units of translation in the block of source code and the target units of translation in the block of target code.

In another embodiment of the invention, the content processor further translates content in the source units of translation to the associated target units of translation.

In another embodiment of the invention, the delineating characteristics include syntactic characteristics, and the content processor further determines pairs of instances of syntactic characteristics of the source content.

In another embodiment of the invention, the delineating characteristics include document formatting characteristics, and the content processor further determines pairs of instances of document formatting characteristics of the source content.

In another embodiment of the invention, the document formatting characteristics include HTML code.

In another embodiment of the invention, the delineating characteristics include conceptual characteristics, and the content processor further determines pairs of instances of conceptual characteristics of the source content.

In another embodiment of the invention, the conceptual characteristics include spatial adjacency.

In another embodiment of the invention, the delineating characteristics include sound-based characteristics, and the content processor further determines pairs of instances of sound-based characteristics of the source content.

In another embodiment of the invention, the sound based characteristics include voice inflections.

In another embodiment of the invention, the delineating characteristics one or more markers manually inserted by a user, and the content processor further determines pairs of instances of markers within the source content.

In another embodiment of the invention, the segment processor further translates the source units of translation into a target language so as to form target units of translation, and merges the target units of translation into one or more blocks of target content.

In another embodiment of the invention, the source units of translation are characterized by a first adjacency pattern, and the segment processor further merges the target units of translation so as to follow the first adjacency pattern.

In another embodiment of the invention, the source units of translation are characterized by a first adjacency pattern, and the segment processor further merges the target units of translation so as to follow a second adjacency pattern different from the first adjacency pattern.

In another embodiment of the invention, at least one of the source units of translation corresponds with two or more target units of translation.

In another embodiment of the invention, two or more of the source units of translation correspond with a single target unit of translation.

In another embodiment of the invention, each one of the source units of translation corresponds with a single target unit of translation.

In another embodiment of the invention, the segment processor further merges the target units of translation into a hierarchical structure.

In another embodiment of the invention, the segment processor further receives one or more predetermined hierarchy criteria, and the characteristics of the hierarchical structure are defined by the predetermined hierarchy criteria.

In another aspect, the invention comprises a system for computer assisted identification one or more source units of translation in a block of source content, so as to segment the block of text into the one or more source units of translation. The system includes means for allowing a user to select one or more delineating characteristics of the source content in addition to lexical characteristics. The system also includes means for determining one or more pairs of instances of the delineating characteristics in the block of source content. The system further includes, for each pair of instances of the delineating characteristics, means for associating a first instance of the pair with a first boundary of a source unit of translation, and means for associating a second instance of the pair with a second boundary of the source unit of translation.

In another aspect, the invention comprises a method of dynamically selecting one or more segmentation criteria used to identify source units of translation in a block of source content, wherein the segmentation criteria identifies delineation characteristics of the source content for defining boundaries of the source units of translation. The method includes providing two or more source segmentation criteria associated with the block of source content. The method also includes selecting one of the source segmentation criteria from the two or more segmentation criteria as an initial source criterion, and using the initial source criterion for defining boundaries of the source units of translation. The method further includes dynamically selecting, as a function of one or more external factors, subsequent source segmentation criteria from the two or more source segmentation criteria, as the boundaries of the source units of translation are defined.

Another embodiment of the invention further includes providing two or more target segmentation criteria associated with a block of target content. The method further includes selecting one of the target segmentation criteria from the two or more target segmentation criteria as an initial target criterion, and using the initial target criterion for defining boundaries of the target units of translation. The method also includes dynamically selecting, as a function of one or more external factors, subsequent target segmentation criteria from the two or more target segmentation criteria, as the boundaries of the target units of translation are defined. The method also includes assigning associations among the source units of translation in the block of source code and the target units of translation in the block of target code.

In another embodiment of the invention, the one or more external factors includes the associations among the source units of translation in the block of source code and the target units of translation in the block of target code.

In another embodiment of the invention, the one or more external factors includes input from a user translating from the source units of translation to the target units of translation.

In another embodiment of the invention, the one or more external factors includes data relating to characteristics of the source content.

In another embodiment of the invention, the data relating to characteristics of the source content includes HTML code.

In another aspect, the invention comprises a system for computer assisted dynamic selection of one or more segmentation criteria used to identify source units of translation in a block of source content. The segmentation criteria identifies delineation characteristics of the source content for defining boundaries of the source units of translation. The system includes a user interface for providing two or more source segmentation criteria associated with the block of source content, and for selecting one of the source segmentation criteria from the two or more segmentation criteria as an initial source criterion. The system also includes a content processor for using the initial source criterion for defining boundaries of the source units of translation. The system further includes a segment processor for dynamically selecting, as a function of one or more external factors, subsequent source segmentation criteria from the two or more source segmentation criteria, as the boundaries of the source units of translation are defined.

In another embodiment of the invention, the user interface further provides two or more target segmentation criteria associated with a block of target content, and selects one of the target segmentation criteria from the two or more target segmentation criteria as an initial target criterion. The content processor further uses the initial target criterion for defining boundaries of the target units of translation. The segment processor further dynamically selects, as a function of one or more external factors, subsequent target segmentation criteria from the two or more target segmentation criteria, as the boundaries of the target units of translation are defined. The segment processor further assigns associations among the source units of translation in the block of source code and the target units of translation in the block of target code.

In another embodiment of the invention, the one or more external factors includes the associations among the source units of translation in the block of source code and the target units of translation in the block of target code.

In another embodiment of the invention, the one or more external factors includes input from a user translating from the source units of translation to the target units of translation.

In another embodiment of the invention, the one or more external factors includes data relating to characteristics of the source content.

In another embodiment of the invention, the data relating to characteristics of the source content includes HTML code.

In another aspect, the invention comprises a system for computer assisted dynamic selection of one or more segmentation criteria used to identify source units of translation in a block of source content. The segmentation criteria identify delineation characteristics of the source content for defining boundaries of the source units of translation. The system includes means for providing two or more source segmentation criteria associated with the block of source content, and for selecting one of the source segmentation criteria from the two or more segmentation criteria as an initial source criterion. The system further includes means for using the initial source criterion for defining boundaries of the source units of translation. The system also includes means for dynamically selecting, as a function of one or more external factors, subsequent source segmentation criteria from the two or more source segmentation criteria, as the boundaries of the source units of translation are defined.

Another embodiment of the invention further includes means for providing two or more target segmentation criteria associated with a block of target content. The system further includes means for selecting one of the target segmentation criteria from the two or more target segmentation criteria as an initial target criterion, and using the initial target criterion for defining boundaries of the target units of translation. The system also includes means for dynamically selecting, as a function of one or more external factors, subsequent target segmentation criteria from the two or more target segmentation criteria, as the boundaries of the target units of translation are defined. The system also includes means for assigning associations among the source units of translation in the block of source code and the target units of translation in the block of target code.

BRIEF DESCRIPTION OF DRAWINGS

The foregoing and other objects of this invention, the various features thereof, as well as the invention itself, may be more fully understood from the following description, when read together with the accompanying drawings in which:

FIG. 2A illustrates the sample paragraph and a list of selected delineating characteristics;

FIG. 3A shows source content as paragraphs represented as separate, contained segments or bigger paragraphs that contain sub-paragraphs;

FIG. 3B shows the content of the first paragraph of FIG. 3A in hierarchical form;

FIG. 3C shows the content of the second paragraph of FIG. 3A in hierarchical form; and, FIG. 4 illustrates a computer-based system for splitting and merging blocks of information content according to the method of FIG. 1.

DESCRIPTION OF THE PREFERRED EMBODIMENTS

Figure 1:
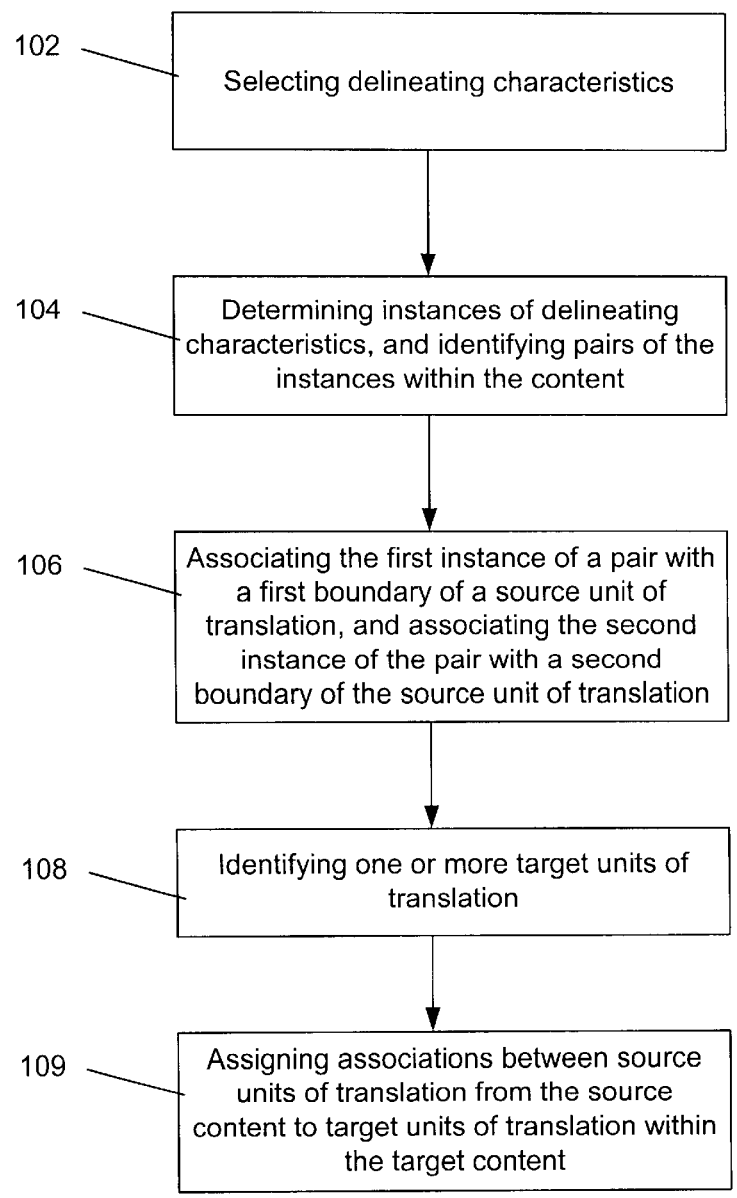
FIG. 1 shows a flow diagram of a method for splitting and merging blocks of information content according to the present invention.

One embodiment of a method 100 for splitting and merging blocks of information content according to the present invention is shown in flow-diagram form in FIG. 1. In one aspect, the method identifies units of translation in a block of source content (hereinafter referred to as "source units of translation") based on one or more delineating characteristics associated with the source content. Within the block of source content, individual source units of translation exist bounded by delineating instances. Examples of delineating instances include (but are not limited by) syntactic characteristics (i.e., the relationships among characters or groups of characters within the content), lexical characteristics (e.g., punctuation, character case, white space between characters), conceptual characteristics (e.g., semantics, such as characters or character groups that should be spatially adjacent to be proper in a particular language), multimedia content characteristics (e.g., proper relationships among various multi-media components), sound based characteristics (e.g., voice inflection), markup/formatting characteristics (e.g., an HTML document, or the row/column boundaries of a table), and markers manually inserted into the content by the translator.

In general, a translator (i.e., a person with knowledge of the target language and the source language; also referred to herein as a "user") translates the source content by translating the individual source units of translation into target units of translation. A competent translator may desire to have the source units of translation formed by different delineating instances, as described above, depending upon the nature of the document. For example, in one area of content, a translator may wish to have the units of translation formed by lexical instances such as punctuation. Thus, in that area of content the units of translation could simply be phrases delineated by periods, commas, semicolons, etc. In another area of content, the translator may desire to have the units of translation formed by syntactical instances, such as grammatical structural boundaries. In yet another situation, a translator may be translating an Internet web page, so that the translator may want to use HTML markup characters as the boundary delineators for the units of translation. In other cases, the translator may desire to have a mixture of boundary delineators for the units of translation (e.g., HTML character on one boundary, and a lexical instance on the other boundary).

As FIG. 1 shows, the method 100 begins by selecting 102 at least one, but possibly several, delineating characteristics in addition to lexical characteristics. The delineating characteristics are chosen in addition to lexical characteristics because the use of lexical characteristics alone is nearly trivial. In other words, segmenting the content by sentences delineated by periods, or phrases delineated by commas, is a relatively common practice. However, segmenting the content using other criteria, either alone, in combination with lexical characteristics, or combinations thereof is novel and an important aspect of the present invention. The method 100 then determines 104 of instances of the selected delineating characteristics within the source content, and identifying at least one pair of the instances in the content. The pairs of instances do not need to be consecutive within the content, although in many cases they will be consecutive. The method 100 then evaluates individual pairs of instances of delineating characteristics. The method 100 associates 106 the first instance of a pair with a first boundary of a source unit of translation, and associates the second instance of the pair with a second boundary of the source unit of translation. Thus, the method 100 identifies the source units of translation within the content by using the various delineating characteristics. In general, the pairs of instances will both be the same type of characteristic, i.e., both lexical, or both syntactical, etc. In other embodiments, the method may identify units of translation via a hybrid pair of instances, i.e., the first instance may be syntactic, and the second instance could be conceptual, as described herein. In some embodiments of the invention, the translator (i.e., the user) selects the delineating characteristics (step 102) and the remaining steps (steps 104 and 106) are completely automatic. In other embodiments, the translator provides input to steps 104 and 106 as well. For example, in some embodiments the actual instances within the content may be automatically determined, and the translator may manually select (via keystrokes or mouse clicks on the computer, for example) which instances should be paired.

Figure 2B:
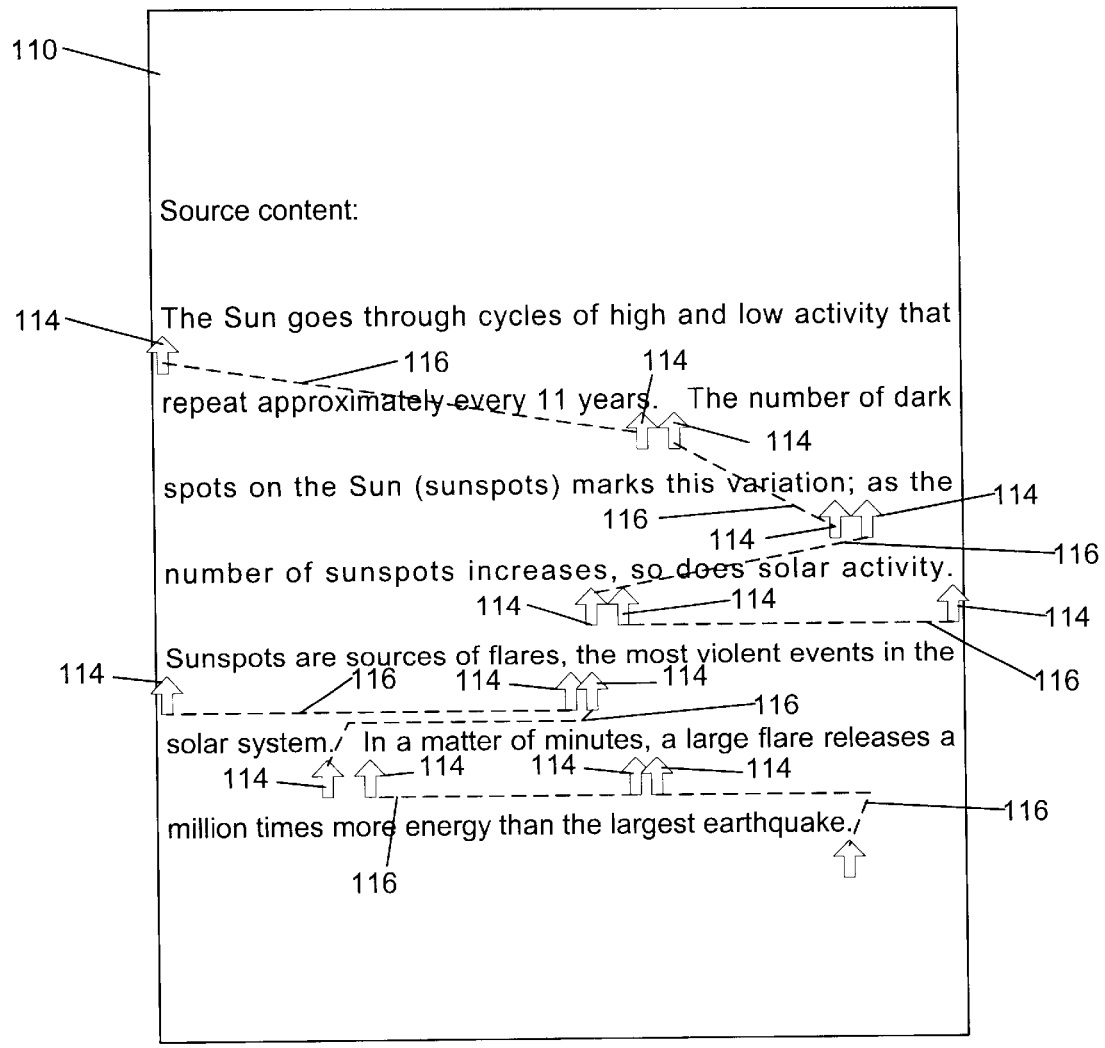
FIG. 2B shows the delineating instances determined within the content of FIG. 2A.
Figure 2C:
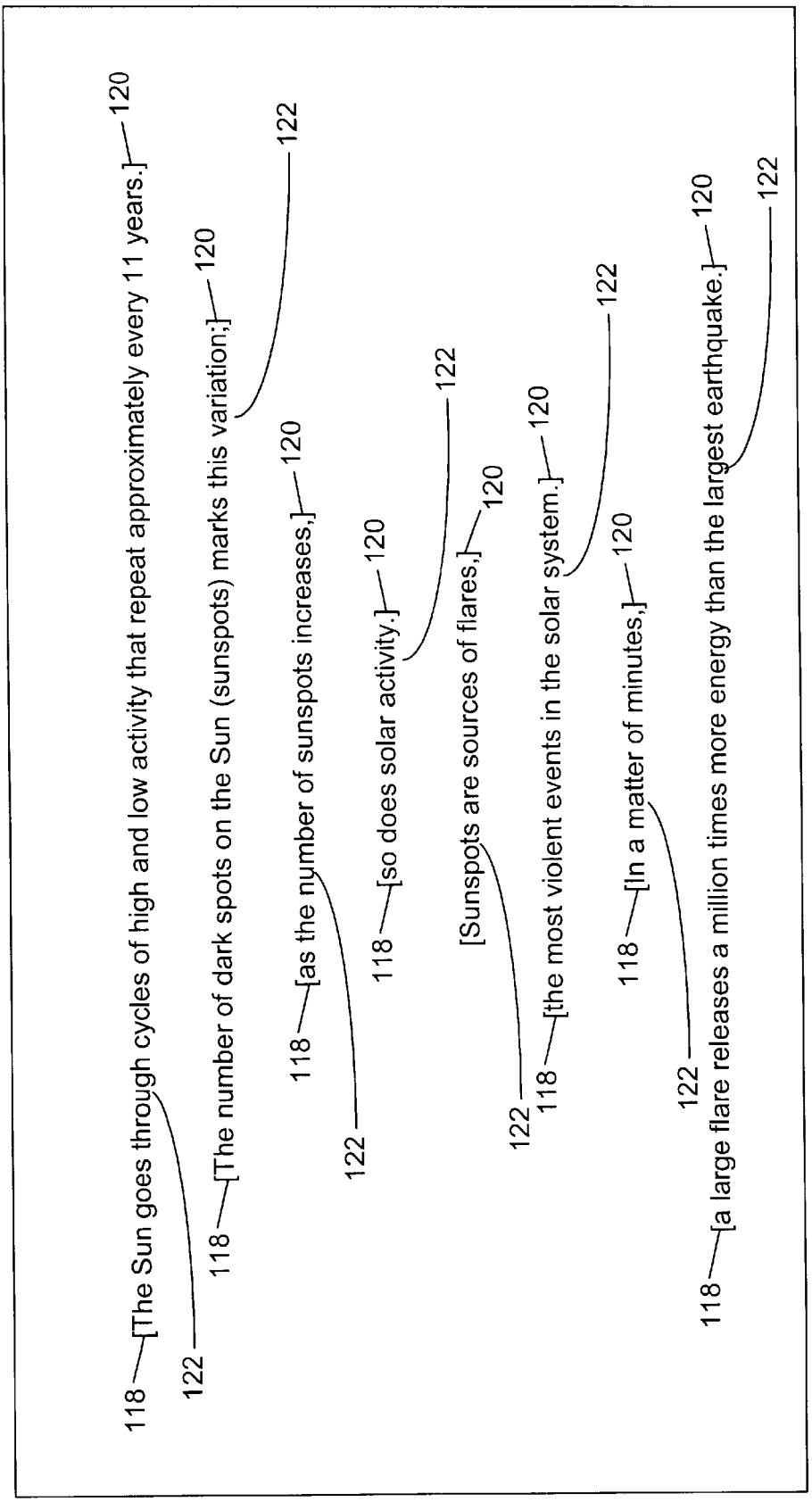
FIG. 2C shows the first boundary and the second boundary of each unit of translation corresponding to the delineating instances of FIG. 2B.

FIGS. 2A, 2B and 2C illustrate a sample source paragraph segmented into source units of translation by the method 100. FIG. 2A illustrates the sample paragraph 110 and the list 112 of selected delineating characteristics. For simplicity in this example, only "lexical" characteristics are included, although other characteristics, alone or in combination, may also be included in the list. FIG. 2B shows the delineating instances 114 determined within the content, and the pairs 116 the method 100 identifies. FIG. 2C shows the first boundary 118 and the second boundary 120 of each unit of translation 122 as determined by the method 100.

In one embodiment of the invention, the method 100 further identifies 108 one or more target units of translation, and assigns 109 associations between source units of translation from the source content to target units of translation within the target content. In general, the associations among the target units and the source units of translation are dictated by the language translation the translator performs from the source content to the target content. The association may be, but is not necessarily, a one to one relationship between the source unit of translation and the target unit of translation. In some cases, two or more source units of translation may be associated with a single target unit of translation. In other cases, a single source unit of translation may be associated with two or more target units of translation. In general, the translator defines the initial association during the act of translation. The source-to-target associations are typically stored in translation memory (TM), so that future occurrences of the source unit of translation in the source content can be automatically associated to a target unit of translation.

The source units of translation are typically characterized by an adjacency pattern, i.e., the first source unit of translation is adjacent to the second source unit of translation, the second source unit of translation is adjacent to the third source unit of translation, etc. In some embodiments, the method enforces this adjacency pattern during the association with the target units of translation, so that the target content follows the adjacency pattern of the source content. In other embodiments, the nature of the language dictates that the target units of translation do not follow the adjacency pattern of the source units of translation. One example of this is when the source content is interspersed with comments or other non-essential content segments. In this case, the translator may wish to delete the comments from the target content, and would simply not associated the source units of translation that contain the comments with any target units of translation.

In one embodiment of the invention, the method merges the target units of translation into a hierarchical structure. FIGS. 3A, 3B and 3C illustrate an example of hierarchical structuring. FIG. 3A shows source content as paragraphs (and the sentences that form the paragraphs) represented as separate, contained segments or bigger paragraphs that contain sub-paragraphs. FIG. 3A also shows the content broken down into the first level of hierarchy—the three main paragraphs in the content. FIG. 3B shows the hierarchical breakdown of the first paragraph, and FIG. 3C shows the hierarchical breakdown of the third paragraph. Note that the second paragraph is a single sentence, and so no further hierarchical breakdown is necessary. In the most extreme case, the entire content could be represented as one segment. With the present invention, the user (i.e., the translator) has the ability to configure how paragraphs can be merged. For example, if the server upon which the Split/Merge is resident is configured such that paragraphs with blank lines between them can be merged, the user may segment the Example shown in FIG. 1 as depicted in FIG. 2. A box represents one segment that can be translated separately (assuming that it is not a Tag only segment). The user can merge segments that are siblings (sentences within a paragraph) and translate the result as one segment. Likewise, the user can split a segment that contains children and translate each child separately. While the user can dynamically split and merge the segments, they can only view one level for any given node at a time. For example, the user can not translate at the paragraph and sentence level for the same paragraph at the same time. They can, however, decide to translate one segment as a paragraph, and a different paragraph at the sentence level. In one embodiment, the translator may provide one or more hierarchy criteria, such that the method merges the target units of translation into a hierarchical structure defined by the criteria. In other embodiments, a fixed, predetermined set of hierarchy criteria may be accessible by the method for hierarchical structuring of the target units of translation.

Another aspect of the invention includes a method 150 of selecting the one or more segmentation criteria that are used to identify source units of translation in a block of source content. The segmentation criteria identify the delineation characteristics described herein that define the boundaries of the source units of translation. The method 150 includes providing 152 a set of two or more source segmentation criteria that are associated with the block of source content. The method 150 also includes selecting 154 one of the source segmentation criteria as an "initial" source criterion that is used for defining boundaries of the first source units of translation within the source content. The method 150 further includes dynamically selecting 156 subsequent source segmentation criteria from the set of source segmentation criteria as the boundaries of the source units of translation are defined. The dynamic selection is done as a function of one or more external factors, typically including inputs from the translator as he or she performs the translation. Thus, in one embodiment of the method 150, the translator designates several segmentation criteria that identify delineation characteristics that may be useful in segmenting a particular block of source content. In some cases, the segmentation criteria may simply be the delineation criteria themselves, as defined herein for the method 100. In other cases, the segmentation criteria may include higher-level translation goals that imply the use of a particular set of delineation characteristics. In other cases, the segmentation criteria may be real time input from the translator (such as keystrokes, "point and click" via a mouse interface, or voice inflections). Once a set of segmentation criteria have been designated, the translator selects one (or possibly more) of the criteria to be used initially. As the translation proceeds, the translator may change the criteria "on the fly," i.e., dynamically selecting criteria from the designated list as the translator deems appropriate for the content.

In one embodiment of the invention, the method 150 further includes selecting 158 one or more segmentation criteria that are used to identify target units of translation for a block of target content. Similar to the source segmentation criteria, the target segmentation criteria identify the delineation characteristics that define the boundaries of the target units of translation. In some embodiments, the set of target criteria and source criteria may be identical, i.e., a common set of criteria may be used for both target and source criteria. The method 150 further includes providing 160 a set of two or more target segmentation criteria that are associated with the block of target content. The method 150 also includes selecting 162 one of the target segmentation criteria as an "initial" target criterion that is used for defining boundaries of the first target units of translation within the target content. The method 150 further includes dynamically selecting 164 subsequent target segmentation criteria from the set of target segmentation criteria as the boundaries of the target units of translation are defined. As with the source content, the dynamic selection is done as a function of one or more external factors, typically including inputs from the translator as he or she performs the translation. The external factors may also include, among other things, information related to the content itself, such as HTML code that describes the layout of a web page, or data file that provides the structural layout of the source document. The method 150 also assigns associations among the source units of translation and the target units of translation. In general, the associations among the target units and the source units of translation are dictated by the language translation the translator performs from the source content to the target content. The association may be, but is not necessarily, a one to one relationship between the source unit of translation and the target unit of translation. In some cases, two or more source units of translation may be associated with a single target unit of translation. In other cases, a single source unit of translation may be associated with two or more target units of translation. In general, the translator defines the initial association during the act of translation. The source-to-target associations are typically stored in translation memory (TM), so that future occurrences of the source unit of translation in the source content can be automatically associated to a target unit of translation.

Figure 4:
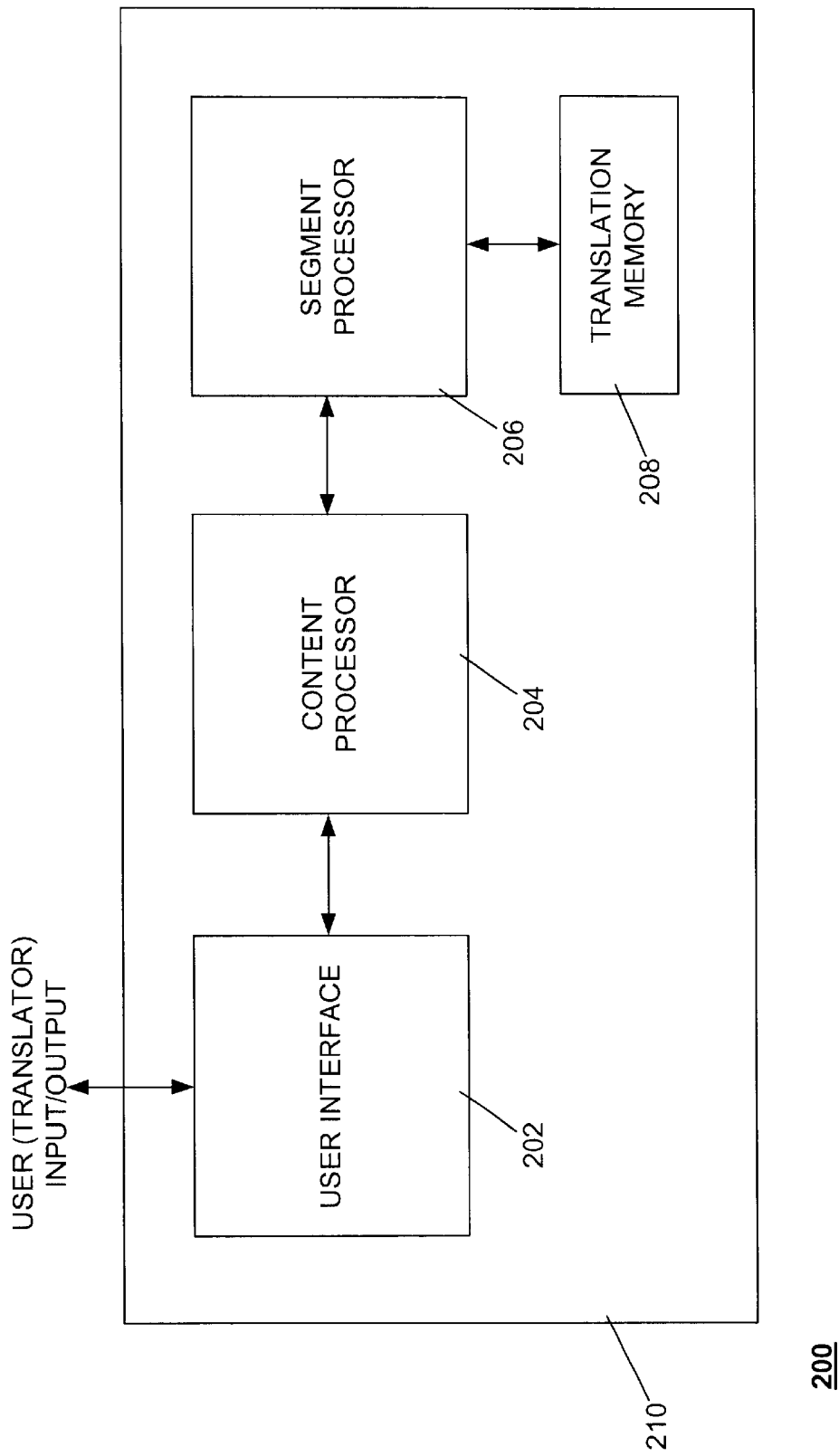

A computer-based system 200 for splitting and merging blocks of information content according to the present invention is conceptually illustrated in FIG. 4. In one embodiment, the system 200 includes a user interface 202, a content processor 204, a segment processor 206, and a translation memory (TM) 208, all resident on a computer system 210 such as a personal computer, workstation or similar system known in the art. The user interface 202 provides a mechanism for a translator to select the delineating characteristics in addition to lexical characteristics, as described herein. In one embodiment, the translator selects from a group of predetermined characteristics. In other embodiments, the translator is provided the option of entering his or her own characteristics that may be unique to the source and/or target content. The user interface 202 also provides the translator a mechanism for manually inserting delineating markers so that the translator can manually segment units of translation. The user interface may include a keyboard input for keystrokes, a mouse input for point-and-click input, or a voice recognition processor for recognizing voice commands and inflections. The user interface also provides an output interface to the user from the system 200, so that the translation procedure is interactive.

The content processor 204 then analyzes the source content and determines instances of the selected delineating characteristics within the source content. The content processor also identifies one or more pairs of instances from all of the instances it finds. The pairs of instances do not need to be consecutive within the content, although in many cases they will be consecutive. The segment processor 206 then evaluates individual pairs of instances of delineating characteristics. The segment processor 206 associates the first instance of a pair with a first boundary of a source unit of translation, and associates the second instance of the pair with a second boundary of the source unit of translation. Thus, the segment processor 206 identifies the source units of translation within the content by using the various delineating characteristics, as described herein. In one embodiment of the invention, the segment processor 206 further identifies one or more target units of translation, and assigns associations between source units of translation from the source content to target units of translation within the target content, as described herein. In general, the translator defines the initial association during the act of translation. The source-to-target associations are stored in TM 208, so that future occurrences of the source unit of translation in the source content can be automatically associated to a target unit of translation.

The system 200 also allows the translator to dynamically select and vary the segmentation criteria the system uses to identify source and target units of translation, and to dynamically vary the criteria the system uses to merge the target units of translation after they have been formed. The translator provides a set of source and target segmentation criteria to the system via the user interface 202. The translator selects, also via the user interface 202, initial source and target segmentation criteria, and the user interface 202 provides these selections to the content processor 204 and the segment processor 206, which in turn utilize the selections to segment and merge the units of translation. As the translator performs the translation of the source content into the target content, he or she may decide at some point in the translation that the current segmentation criteria is not suitable, and that different criteria would be more appropriate. The translator may, "on the fly," provide new segmentation criteria to the system 200 via the user interface 202, selected from the set of criteria entered earlier. The segment processor 206 subsequently uses the new segmentation criteria to segment and merge content thereafter.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are thus intended to be embraced therein.

What is claimed is:

1. A system for computer assisted identification one or more source units of translation in a block of source content, so as to segment the block of text into the one or more source units of translation, comprising:

means for allowing a user to select one or more delineating characteristics of the source content in addition to lexical characteristics;

means for determining one or more pairs of instances of the delineating characteristics in the block of source content; and, for each pair of instances of the delineating characteristics, means for associating a first instance of the pair with a first boundary of a source unit of translation, and associating a second instance of the pair with a second boundary of the source unit of translation.

2. A system for computer assisted dynamic selection of one or more segmentation criteria used to identify source units of translation in a block of source content, wherein the segmentation criteria identifies delineation characteristics of the source content for defining boundaries of the source units of translation, comprising:

means for providing two or more source segmentation criteria associated with the block of source content, and for selecting one of the source segmentation criteria from the two or more segmentation criteria as an initial source criterion;

means for using the initial source criterion for defining boundaries of the source units of translation; and, means for dynamically selecting, as a function of one or more external factors, subsequent source segmentation criteria from the two or more source segmentation criteria, as the boundaries of the source units of translation are defined.

3. A system according to claim 2, further including:

means for providing two or more target segmentation criteria associated with a block of target content;

means for selecting one of the target segmentation criteria from the two or more target segmentation criteria as an initial target criterion, and using the initial target criterion for defining boundaries of the target units of translation;

means for dynamically selecting, as a function of one or more external factors, subsequent target segmentation criteria from the two or more target segmentation criteria, as the boundaries of the target units of translation are defined, and, means for assigning associations among the source units of translation in the block of source code and the target units of translation in the block of target code. instance of the pair with a second boundary of the source unit of translation.

\* \* \* \* \*

UNITED STATES PATENT AND TRADEMARK OFFICE
CERTIFICATE OF CORRECTION

PATENT NO. : 6,782,384 B2
DATED : August 24, 2004
INVENTOR(S) : Sloan et al.

Page 1 of 1

It is certified that error appears in the above-identified patent and that said Letters Patent is hereby corrected as shown below:

<u>Column 14,</u>
Line 38, after "code.", delete "instance of the pair with a second boundary of the source unit of translation".

Signed and Sealed this

Fourteenth Day of December, 2004

JON W. DUDAS
*Director of the United States Patent and Trademark Office*